(12) United States Patent
Douglas

(10) Patent No.: US 9,133,038 B2
(45) Date of Patent: *Sep. 15, 2015

(54) TREATMENT OR REMEDIATION OF NATURAL OR WASTE WATER

(75) Inventor: Grant Brian Douglas, Parkerville (AU)

(73) Assignee: Commonwealth Scientific and Industrial Research Organisation, Campbell, Australian Capital Territory (AU)

( * ) Notice: Subject to any disclaimer, the term of this patent is extended or adjusted under 35 U.S.C. 154(b) by 311 days.

This patent is subject to a terminal disclaimer.

(21) Appl. No.: 13/319,983

(22) PCT Filed: Mar. 19, 2010

(86) PCT No.: PCT/AU2010/000317
§ 371 (c)(1),
(2), (4) Date: Jun. 1, 2012

(87) PCT Pub. No.: WO2010/105303
PCT Pub. Date: Sep. 23, 2010

(65) Prior Publication Data
US 2012/0228229 A1 Sep. 13, 2012

(30) Foreign Application Priority Data

Mar. 20, 2009 (AU) .................................. 200901213
Oct. 2, 2009 (AU) ................................ 2009904792

(51) Int. Cl.
| | | |
|---|---|---|
| B01D 21/00 | (2006.01) | |
| C02F 1/52 | (2006.01) | |
| B01D 21/01 | (2006.01) | |
| B03D 3/00 | (2006.01) | |
| C01F 7/00 | (2006.01) | |
| B01J 20/08 | (2006.01) | |
| C02F 1/42 | (2006.01) | |
| C02F 1/68 | (2006.01) | |
| C01F 1/00 | (2006.01) | |
| C22B 21/00 | (2006.01) | |
| C22B 61/00 | (2006.01) | |
| C02F 101/20 | (2006.01) | |

(52) U.S. Cl.
CPC ................. *C01F 7/005* (2013.01); *B01J 20/08* (2013.01); *C02F 1/42* (2013.01); *C02F 1/5245* (2013.01); *C01P 2002/22* (2013.01); *C02F 2101/20* (2013.01)

(58) Field of Classification Search
None
See application file for complete search history.

(56) References Cited

U.S. PATENT DOCUMENTS

| | | | |
|---|---|---|---|
| 3,539,306 A | | 11/1970 | Kumura et al. |
| 4,904,457 A | * | 2/1990 | Misra ............................ 423/115 |
| 5,114,898 A | | 5/1992 | Pinnavaia et al. |
| 5,360,547 A | * | 11/1994 | Cockett et al. ................ 210/690 |
| 5,945,003 A | * | 8/1999 | Strauel ........................... 210/688 |
| 2003/0006195 A1 | * | 1/2003 | Fuda et al. .................... 210/702 |
| 2004/0040912 A1 | * | 3/2004 | McConchie et al. .......... 210/724 |
| 2009/0305885 A1 | * | 12/2009 | Yamada et al. ............... 502/414 |

FOREIGN PATENT DOCUMENTS

| | | | |
|---|---|---|---|
| WO | WO 93/22237 | 11/1993 | |
| WO | WO 2005120699 A1 | * 12/2005 | ............... B01J 20/06 |

* cited by examiner

*Primary Examiner* — Nam Nguyen
*Assistant Examiner* — Clare Perrin
(74) *Attorney, Agent, or Firm* — Brinks Gilson & Lione

(57) ABSTRACT

A process for treating a natural or wastewater containing dissolved Mg or dissolved Al comprising the steps of adding at least one Mg-containing compound or at least one Al-containing compound to the natural or wastewater to thereby form a layered double hydroxide (LDH) containing Mg and Al as predominant metal species in a lattice of the LDH. The LDH may comprise hydrotalcite. The AL-containing compound may be aluminate or aluminium hydroxide derived from the Bayer process or from an alumina refinery.

28 Claims, No Drawings

TREATMENT OR REMEDIATION OF NATURAL OR WASTE WATER

This application is a National Stage of International Application No. PCT/AU2010/000317 filed on Mar. 19, 2010, which claims priority to Australian Patent Application No. 2009901213, filed on Mar. 20, 2009, and to Australian Patent Application No. 2009904792, filed on Oct. 2, 2009, the entirety of which are hereby incorporated by reference.

FIELD OF THE INVENTION

The present invention relates to a method for treatment and remediation of liquid and solid waste and by-products and natural or wastewater. The waste or natural or wastewater may constitute acid, neutral or alkaline surface and/or groundwater or porewater in-situ or extracted, dissolved or colloidal or particulate wastes or combination thereof and be derived from active or former mineral processing or treatment or waters or oil coal or gas including coal seam gas extraction or processing waters stored or leaking from tailings dams or other impoundments, storages or containers or derived from tailings, the weathering of tailings, water expressed from tailings, overburden or other waste rocks or waters derived from mineral processing residues stored in heaps as unconsolidated waste or solid or liquid wastes or combinations thereof otherwise distributed or contained both above and below ground level such as in pits or tailing dams. The liquid or solid wastes or natural or wastewaters or combinations thereof may also be present within aquifers, as seams, lenses, zones, accumulations, solution fronts, leaks or spills that require treatment or amendment via this method. Many of the waters and solids described above may be present within the mineral, oil or gas extraction process and may be present as pregnant or spent liquors, concentrates, evolved or interstitial waters or as slurries. Surface and/or groundwater or porewater derived from natural processes (e.g. acid sulphate soil weathering) and the solid residues from which they are derived may also be suitable for treatment by this method. Natural or wastewaters containing one or more of dissolved or colloidal or particulate constituents that are partially or totally evaporated may also benefit from this invention. In another aspect, solid or liquid wastes or wastewaters or discharge derived from the operation and maintenance of nuclear power plants, nuclear weapons manufacture or decommissioning, nuclear research facilities, nuclear fuel enrichment or processing or similar facilities or operations may be treated and stored via this invention.

For convenience and brevity, hereinafter in this specification the term "liquid and solid waste and by-products and natural and wastewater(s)" or "natural or wastewater(s)" or water(s)" will be used to refer to all of the waters, other liquids or solutes or solvents or mixtures whether miscible or immiscible and solids described above but is not limited to or by these examples of these liquid and solid wastes and by-products and natural and wastewater(s).

For convenience and brevity, the term hydrotalcite (HT) will specifically refer to hydrotalcite with Mg and Al as the predominant cations as a member of the group of minerals termed Layered Double Hydroxides (LDH) but it is appreciated that there will be variation in the composition as a reflection of the method of formation and solution chemistry from which they are produced.

BACKGROUND OF THE INVENTION

The liquid or solid wastes and by-products or natural or wastewater(s) or water(s) present as described above may be derived from a multitude of sources. Examples of these sources may include:

Oxidation of sulphide-containing soils to form acid sulphate soils (ASS) and acidic water(s) by natural processes (e.g. seasonal changes in groundwater level and/or oxygen status) or soil or rock disturbance (e.g. during construction or excavation)

Industrial processes (e.g. pyrite oxidation, sulphuric acid production) with offsite loss via soil/groundwater infiltration or via natural or artificial drainages of water(s)

Discharge, escape and infiltration of acidic, neutral or alkaline surface water(s) from mining or extractive metallurgical operations In-situ leaching of orebodies (e.g. uranium or copper ores)

Liquid or solid wastes and by-products and natural and wastewaters such as surface, groundwater and porewater, wastewaters derived from mineral processing (e.g. alkaline red mud via the Bayer process, mineral processing of uranium or copper ores) or water(s) or tailings contained within or derived from tailings storage facilities, storages, containers or other impoundments.

Injected, formation or aquifer waters, derived or contaminated waters, or combinations thereof, derived or obtained from the extraction of one or more of oil, gas, coal seam gas extraction and recovery or associated petrochemical operations including refining, distillation, gas- or oil-water phase separation and water purification and contaminant removal and reuse including injection or re-injection into aquifers, oil or gas deposits, evaporation, irrigation or environmental reuse or discharge.

It is also well recognized that liquid or solid wastes and wastewaters derived from the operation and maintenance of nuclear power plants, nuclear weapons manufacture or decommissioning, nuclear fuel enrichment or processing, nuclear research facilities or similar facilities often represent a major challenge in terms of conversion to stable solid phase materials for transport and storage or reprocessing of constituent radionuclides and other elements represent a seemingly intractable problem particularly if viewed in the context of secure and physically and chemically robust short-term to long-term geological repository.

As a consequence of the processes that lead to the formation of these liquid and solid waste and by-products and natural and wastewater(s) they may often be enriched in a variety of metals, metalloids and anions, the concentrations of which may exceed both ANZECC Soil and Water Quality guidelines (ANZECC/NHMRC, 1992). In addition, liquid and solid waste and by-products and natural and wastewater(s) containing radionuclides particularly from the uranium mining and processing (e.g. U, Th, Ra, etc) or nuclear power, weapons and/or research industries (U, Ra, Pu, Tc etc) may also be produced with a requirement for safe short- to long-term storage, preferably using LDH or HT chemistry.

Thus, a challenge exists to identify methods for remediation of liquid and solid waste and by-products and natural and wastewater(s) that are both cost-effective and environmentally robust with safe and efficient immobilization (and if appropriate, off-site disposal) of the contaminants after neutralization. Effective long-term management of liquid and solid waste and by-products and natural and wastewater(s) containing a range of contaminants including metals, metalloids and organics and radionuclides is also required to meet regulatory requirements.

Layered double hydroxides (LDH) are a class of both naturally occurring and synthetically produced materials characterised by a positively-charged mixed metal hydroxide layers separated by interlayers that contain water molecules and a variety of exchangeable anions. A LDH is most commonly formed by the co-precipitation of divalent (e.g. $Mg^{2+}$, $Fe^{2+}$) and trivalent (e.g. $Al^{3+}$, $Fe^{3\pm}$) metal cation solutions at moderate to high pH (Taylor, 1984, Vucelic et al, 1997, Shin et al, 1996).

The LDH or HT may be used for the removal of a wide range of inorganic and organic contaminants including radionuclides from liquid and solid waste and by-products and natural and wastewater(s). In addition, the LDH or HT may be utilised as a repository of elements or components of solid wastes including contaminants including radionuclides that have been dissolved (e.g. by acid or alkali) and precipitated or recrystallised using the method/chemistry described here.

A LDH compound may be represented by the general formula (1):

$$M_{(1-x)}^{2+}M_x^{3+}(OH)_2A^{n-}\cdot yH_2O \qquad (1)$$

where $M^{2+}$ and $M^{3+}$ are divalent and trivalent metal ions, respectively and $A^{n-}$ is the interlayer ion of valence n. The x value represents the proportion of trivalent metal ion to the proportion of total amount metal ion and y denotes variable amounts of interlayer water.

Common forms of LDH comprise $Mg^{2+}$ and $Al^{3+}$ (commonly known as HT) and $Mg^{2+}$ and $Fe^{3+}$ (known as pyroaurites), but other cations, including Ni, Zn, Mn, Ca, Cr and La, are known. The amount of surface positive charge generated is dependant upon the mole ratio of the metal ions in the lattice structure and the conditions of preparation as they affect crystal formation.

The formation of HT (the most commonly synthesised LDH frequently with carbonate as the principal "exchangeable" anion) may be most simply described by the following reaction:

$$6MgCl_2+2AlCl_3+16NaOH+H_2CO_3 \rightarrow Mg_6Al_2(OH)_{16}CO_3\cdot nH_2O+2HCl$$

Typically, ratios of divalent to trivalent cations in Hydrotalcites vary from 2:1 to 3:1. Other synthetic pathways to form HT (and other LDH) include synthesis from $Mg(OH)_2$ (brucite) and MgO (calcined magnesia) via neutralisation of acidic solutions (eg. Albiston et al, 1996). This can be described by the following reaction:

$$6Mg(OH)_2+2Al(OH)_3+2H_2SO_4 \rightarrow Mg_6Al_2(OH)_{16}SO_4\cdot nH_2O+2H_2O$$

A range of metals of widely varying concentrations may also be simultaneously co-precipitated, hence forming a polymetallic LDH. HT or LDH were first described over 60 years ago (Frondel, 1941, Feitknecht, 1942). Sometimes, they can also occur in nature as accessory minerals in soils and sediments (eg. Taylor and McKenzie, 1980). Layered double hydroxides may also be synthesised from industrial waste materials by the reaction of bauxite residue derived from alumina extraction (red mud) with seawater (eg. Thornber and Hughes, 1987), as described by the following reaction:

$$6Mg(OH)_2+2Al(OH)_3+2Na_2CO_3 \rightarrow Mg_6Al_2(OH)_{16}CO_3\cdot nH_2O+2NaOH$$

or by the reaction of lime with fly ash derived from fossil fuel (eg. coal fired power stations, Reardon and Della Valle, 1997).

Within the LDH or HT structure there are octahedral metal hydroxide sheets that carry a net positive charge due to limited substitution of trivalent for divalent cations as described above. As a consequence, it is possible to substitute a wide range of inorganic or organic anions into the LDH or HT structure. These anions are often referred to as "interlayer anions" as they fit between the layers of hydroxide material. Layered double hydroxides are generally unstable below a pH of approximately 5 (Ookubu et al, 1993) but may act as buffers over a wide range of solution pH (Seida and Nakano, 2002). Layered double hydroxides or HT, and in particular those that contain carbonate as the predominant anion, have also been demonstrated to have a considerable capacity to neutralise a range of mineral acids via consumption of both the hydroxyl and carbonate anions contained within the LDH structure (eg. Kameda et al, 2003).

A number of studies have been conducted to investigate ways to exploit the anion exchange properties of LDH. These studies have focussed on the removal of phosphate and other oxyanions and humic substances from natural and wastewater(s) (Miyata, 1980, Misra and Perrotta, 1992, Amin and Jayson, 1996, Shin et al, 1996, Seida and Nakano, 2000). Phosphate is one of the many anions that may be exchanged into the interlayer space in LDH. Laboratory studies of phosphate uptake using synthetically prepared Mg—Al HT and a range of initial dissolved phosphate concentrations indicate an uptake capacity of from ca. 25-30 mg P/g (Miyata, 1983, Shin et al, 1996) to ca. 60 mg P/g with uptake also influenced by initial phosphate concentration, pH (with maximum phosphate absorption near pH 7), degree of crystallinity and the HT chemistry (Ookubo et al, 1993). A major obstacle to the use of HT for phosphate removal in natural and/or wastewaters is the selectivity for carbonate over phosphate, with a selectivity series in the approximate order $CO_3^{2-}$> $HPO_4^{2-}$>>$SO_4^{2-}$, $OH^-$>$F^-$>$Cl^-$>$NO_3^-$ (Miyata, 1980, 1983, Sato et al, 1986, Shin et al, 1986, Cavani et al, 1991). Many HT are also synthesised with carbonate as the predominant anion and thus require anion exchange before they are exposed to phosphate. When carbonate is also combined with sulphate, nitrate and chloride (as might commonly occur in natural or wastewaters) the reduction of phosphate absorption to the HT is further decreased (Shin et al, 1996).

A number of recent studies have focussed on the formation and study of synthetic LDH or specifically HT or similar and their subsequent reactivity to a range of anions, particularly silicate (e.g. Depege et al, 1996) with a view to forming polymetallic aluminosilicates, which as potential precursors to clay materials, are thought to limit metal mobility and bioavailability (eg. Ford et al, 1999). A potential also exists for the co-precipitation of silicate and aluminate anions as another precursor of analogue of clay minerals.

Thus, other structural elements or interlayer ions may be incorporated (both inorganic and organic) to assist in both substitution and/or incorporation of ions from solution and/or increased stability. Subsequent formation of chlorite- or phyllosilicate-like minerals from pure Mg—Al or predominantly Mg—Al HT which may be similar to or iso-chemical in composition or may possess a similar chemistry with substitution of some ions as determined by the nature of Mg and/or Al added or the nature and chemical composition of the natural or wastewater which may influence the final geochemical composition, crystallinity or mineralogy.

This increased stability of LDH or HT or chlorite-like minerals or other LDH or HT derivatives may also be achieved possibly in combination with chemical methods described above by partial or complete evaporation, calcination or vitrification leading to part or complete dehydration and partial/total recrystallisation. The use of co-amendments with, or encapsulation of, the LDH or HT may also be an option to further increase physical or chemical stability.

The International Atomic Energy Agency (which is the international centre of cooperation in the nuclear field working with member states and multiple partners worldwide to promote safe, secure and peaceful nuclear technologies) published a report in 2004 summarising the state of the art in the field of treatment of effluents from uranium mines and mills. Importantly, the novelty of the invention as described herein using the addition of chemical compounds to modify solution chemistry to form LDH or HT is exemplified by the absence of any similar description or process for the treatment of effluents from uranium mines (IAEA, 2004).

The applicant does not concede that the prior art discussed herein forms part of the common general knowledge.

Throughout this specification, the word "comprising" and its grammatical equivalents is to be taken to have an inclusive meaning unless the context of use indicates otherwise.

BRIEF DESCRIPTION OF THE PRESENT INVENTION

In a first aspect, the present invention provides a process for treating a natural or wastewater containing dissolved Mg or dissolved Al comprising the steps of adding at least one Mg-containing compound or at least one Al-containing compound to the natural or wastewater to thereby form an LDH containing Mg and Al as predominant metal species in a lattice of the LDH.

In a second aspect, the present invention provides a process for treating a natural or wastewater containing dissolved Mg or dissolved Al comprising the steps of adding at least one Al-containing compound to the natural or wastewater to thereby form an LDH containing Mg and Al as predominant metal species in a lattice of the LDH.

In a third aspect, the present invention provides a process for treating a natural or wastewater containing dissolved Mg or dissolved Al comprising the steps of adding at least one Mg-containing compound to the natural or wastewater to thereby form an LDH containing Mg and Al as predominant metal species in a lattice of the LDH.

In another aspect, the present invention provides a process for treating a solid material containing Mg or Al in a reactive, labile or soluble form comprising the steps of adding at least one Mg-containing compound or at least one Al-containing compound to the solid such that upon dissolution of Mg and/or Al, a LDH containing Mg and Al as predominant metal species in a lattice of the LDH or HT is formed. This LDH or HT may form a discrete phase or may also be expected to form a surface precipitate on the solid material that may partially or completely encapsulate the solid material.

In a further aspect, the present invention provides a process for treating a solid material containing Mg or Al in a reactive, labile or soluble form comprising the steps of adding at least one Al-containing compound to the solid such that upon dissolution of Mg and/or Al, a LDH containing Mg and Al as predominant metal species in a lattice of the LDH is formed.

In yet a further aspect, the present invention provides a process for treating a solid material containing Mg or Al in a reactive, labile or soluble form comprising the steps of adding at least one Mg-containing compound to the solid such that upon dissolution of Mg and/or Al, a LDH containing Mg and Al as predominant metal species in a lattice of the LDH is formed.

The Mg or Al for the treatment of natural or wastewaters or solids contained within are suitably soluble in aqueous solvents, such as water. The water may be acidic, neutral or basic. Where appropriate suitable species of Mg and Al present in non-aqueous solvents, for instance Mg or Al-containing organometallic compounds may also be used. This recognises that many natural or in particular wastewaters and solids contained therein may also be non-aqueous or contained in a substantial miscible to non-miscible organic component. In addition, Mg or Al in compounds that are capable of transferring between both solvents such as in an aqueous to non-aqueous phase transfer may also conceivably be employed.

The LDH formed may be HT or include HT.

In the present invention, Mg ions and Al ions are taken up by the formation of LDH containing Mg and Al as the predominant metal species in the lattice structure of the LDH. Some other LDHs may also be formed. Advantageously, the LDH also can take up and largely immobilise other ions into the interlayer spaces between the lattice. Thus, other ions can also be removed from the water and largely immobilised.

The at least one aluminium-containing compound may comprise aluminate. Throughout this specification, aluminate is used to denote $Al(OH)_4^-$ or $AlO_2^-.2H_2O$.

Other inorganic compounds such as aluminium sulphate (e.g. $Al_2(SO_4)_3.18H_2O$), aluminium hydroxide ($Al(OH)_3$) or organometallic compounds (e.g. aluminium acetylacetonate $C_{15}H_{21}AlO_6$) may also be used where a source of Al is required. Preferably these sources of Al will be alkaline to raise solution pH to an appropriate level for LDH or HT formation, but also may be used where the final solution pH or the combination of these or other compounds is alkaline.

In some embodiments of the present invention, it may also be necessary to add additional Mg to the water in order to adjust the ratio of Al to Mg in the water to the desired level to obtain LDH or HT containing Mg and Al as predominant metal species in a lattice. This may be achieved, for example, by adding MgO or $Mg(OH)_2$ to the water. Advantageously, MgO or $Mg(OH)_2$ also assist in obtaining desirable pH characteristics that are suitable for the formation of LDH, such as HT.

In some embodiments of the present invention, it may be necessary or desirable to add additional alkaline or acid-neutralising material in addition to the at least one Mg-containing compound or the at least one Al-containing compound to the natural or wastewater. The additional alkaline or acid neutralising material may be selected from one or more of alkaline or acid-neutralising solutes, slurries or solid materials or mixtures thereof, such as lime, slaked lime, calcined magnesia, sodium hydroxide, sodium carbonate, sodium bicarbonate or sodium silicate. This list is not exhaustive and other alkaline or acid-neutralising materials may also be added. The additional alkaline or acid-neutralising material may be added before the addition of the at least one Mg-containing compound or the at least one Al-containing compound to the natural or wastewater, together with the addition of the at least one Mg-containing compound or the at least one Al-containing compound to the natural or wastewater, or after the addition of the at least one Mg-containing compound or the at least one Al-containing compound to the natural or wastewater.

In some embodiments of the present invention, the order or sequence of addition of various alkalis or acid-neutralising materials to acid waters, wastewaters or slurries as described elsewhere in this specification may confer certain benefits. For example, the order of addition may confer geochemical and/or operational advantages to the neutralisation process and the formation of Layered Double Hydroxides (LDH) or hydrotalcites (HT) and other mineral precipitates.

It may also be advantageous from a geochemical and/or operational viewpoint to add the acid waters wastewaters or slurries to various alkalis or acid-neutralising materials as described elsewhere in this specification such that there is a decrease from a circumneutral or moderate to high pH back down to an operationally defined pH endpoint or range of endpoints. This for example may take the form of injection or mixing of acid waters, wastewaters or slurries into a mixed vessel, stream or streams of various alkalis or acid-neutralising materials.

Selective, partial or total removal of Layered Double Hydroxide (LDH) or hydrotalcite (HT) and/or other mineral precipitates or slurry components at various stages of the reactions whether via addition of various alkalis or acid-neutralising materials to acid waters, wastewaters or slurries or via addition of acid waters, wastewaters or slurries to various alkalis or acid-neutralising materials as described elsewhere in this specification may also be considered advantageous from a geochemical or operational viewpoint. Such an example involves the removal of precipitates or existing solids or aggregates, mixtures or co-precipitates thereof prior to the introduction of reverse osmosis to remove some or all of remaining solutes or evaporation. This removal of Layered Double Hydroxide (LDH) or hydrotalcite (HT) and/or other mineral precipitates at various stages of the reactions whether via addition of various alkalis or acid-neutralising materials to acid waters, wastewaters or slurries or via addition of acid waters, wastewaters or slurries to various alkalis or acid-neutralising materials as described elsewhere in this specification may be facilitated or enhanced by mechanical (e.g. centrifugation) or chemical (e.g. via addition of flocculants) means or a combination thereof.

In some embodiments of the present invention, partial or total removal of water or other solvents or miscible or immiscible solutes, such as by partial or total evaporation or distillation, may be used to increase the concentrations of one or more of dissolved, colloidal or particulate constituents or additional added constituents such as Mg and/or Al, (e.g. to tailor the appropriate Al to Mg ratio) to increase the concentration by a sufficient degree to induce the formation of LDH or HT.

Many types of liquid and solid waste and by-products and natural and wastewater(s) may have high Mg and/or Al (essential for the formation of LDH or HT) depending on the nature of the mineralisation, the parent rock and/or mineral processing/extraction methods where a variety of reagents may have been added to facilitate the extraction process. One such example are waters derived from the processing of U ore from Ranger Uranium mine in Northern Territory, Australia where both Mg and Al are present in wastewaters. Some waters and in particular subsurface brines encountered or utilised in the oil, coal and gas extraction and in association refining or beneficiation industries may contain, in particular, considerable Mg that may render them amenable for LDH or HT formation via Al addition.

Other waters, dependent on their origin, may contain little or no Mg and/or Al or be dominated by other dissolved ions (e.g. such as those derived from some acid sulphate soils, industrial processes or nuclear power plants, weapons or research facilities). It is noted that not all waters (e.g. processing or wastewaters) have a major ion chemistry suitable for the formation of LDH or specific types of LDH such as Mg—Al HT or similar compositions. Thus, it may be necessary to tailor this chemistry for the formation of LDH or more specifically Mg—Al HT. The tailoring of the solution chemistry may take the form of the addition of one or more reagents such as those containing Mg and/or Al to achieve a suitable chemistry or composition in addition to aluminate or calcined magnesia.

The approach outlined here, specifically the formation of LDH which are principally HT and may also be mixtures of various LDH or HT compositions, distinguishes this invention from a more generic approach of Taylor (2000, U.S. Pat. No. 6,139,753). Taylor (2000) describes treatment of acid waste waters or acid drainage waters containing metals comprising ferrous and ferric ions, the method comprising increasing the pH of the waters to at least 7.5 by addition of alkaline reagent under conditions such that ferrous ions are stable with respect to oxidation to ferric ions and a ratio of the number of moles of divalent ions other than calcium to the number of trivalent ions is in the range from 2 to 20, to form a precipitate in the pH range of 6.0 to 7.5 comprising compounds having a pyroauritic structure and collecting the precipitate. While Fe may be a component of the LDH, the preferred precipitate is an Mg—Al HT with possible substitution of Fe into its structure but with Mg and Al being the predominant cations.

Furthermore, adding aluminate or Al hydroxyl species (for instance $Al(OH)_3$) as the primary source of aluminium ions as well as being a source of alkalinity to the tailings water is novel over Taylor (2000). In particular, the Taylor (2000) US patent exemplifies addition of sodium carbonate, limestone and lime as the alkaline agents and does not specify aluminate as a potential alkaline agent to be added. This addition of aluminate or $Al(OH)_3$ may take the form of reagents such as salts, slurries or precipitates, concentrates or wastewaters/pregnant or spent liquors. This source of aluminate or $Al(OH)_3$ may typically be derived from the Bayer Process used in aluminium refining or from other industrial or commercial sources. In particular, the majority of these reagents or waters are alkaline and thus meet a specific criteria of adding both aluminium (to create an appropriate Mg:Al ratio for LDH or HT formation) and alkalinity to create a pH suitable for HT formation. It is recognised that where additional neutralising capacity or alkalinity is required to facilitate the formation of LDH or HT that other common reagents such as one or more of lime or caustic soda may also be added. These reagents may also be beneficial in for instance the case of high residual sulphate in the residual waters after LDH or HT formation where for instance gypsum may form via the combination of sulphate with lime.

Where additional Mg is required to achieve an appropriate Mg:Al ratio for the formation of LDH or HT and/or an increase in pH may be required in acidic solutions to an alkaline situation then an Mg-containing compound such as calcined magnesia or magnesium salts with or without the combination of aluminate addition or that of other Al-containing compounds may perform both of these tasks. In addition, where the calcined magnesia is impure it may often contain lime and result in side reactions such as the formation of gypsum as described above.

Calcined magnesia (MgO) or its derivative, magnesium hydroxide ($Mg(OH)_2$), possess considerable advantages over other alkalis such as slaked lime ($Ca(OH)_2$) in the neutralisation of acids or acidic wastes[1].

One of the most important advantages of the present invention is the relatively small amount of calcined magnesia (MgO) or magnesium hydroxide ($Mg(OH)_2$) that is required. For the neutralisation of 1 tonne of 98% sulphuric acid, only 424 kg of 96% solid MgO, 613 kg of 96% solid $Mg(OH)_2$ or 1005 kg of a 58% slurry of $Mg(OH)_2$ are required. In comparison, almost 1600 kg of a 50% NaOH solution, 1645 kg of a 45% solution of $Ca(OH)_2$, 3210 kg of a 33% slurry of $Na_2CO_3$ or 975 kg of $CaCO_3$ are required to achieve neutralization of 1 tonne of 98% sulphuric acid.

The chemistry of calcined magnesia also confers a number of distinct advantages in some embodiments of the present invention. Alkalis such as caustic soda or lime can be considered to neutralise by a one-step dissociation reaction that results in the formation of hydroxyl ions and an increase in the solution pH. In contrast, the neutralisation of acidic solutions by calcined magnesia can be considered to be a two-step reaction as magnesium hydroxide, the intermediate product in the neutralisation process is only slightly soluble in water. As a consequence neutralisation occurs as soluble hydroxide ions derived from magnesium hydroxide are consumed by the acid. Using sulphuric acid as the acid source, the neutralisation reactions can be summarised as follows:

$$MgO+H_2O \rightarrow Mg(OH)_2$$

$$Mg(OH)_2 \rightarrow Mg^{2+}+2OH^-$$

$$H_2SO_4+Mg^{2+}+2OH^- \rightarrow MgSO_4+2H_2O$$

As a consequence of the production of hydroxide ions from the slightly soluble magnesium hydroxide, the neutralisation reaction occurs rapidly at low pH and slows appreciably as the pH increases. In addition, varying mineral grainsize can change the reactivity of MgO. In contrast, the neutralisation rate of lime and similar products do not vary appreciably as a function of pH. It is the slower reaction rate of calcined magnesia that results in the formation of denser slurries (eg. of mineral precipitates) relative to lime, thus reducing handling and disposal costs. In addition, the positive charge on magnesium-based alkalis at neutral to marginally alkaline pH attracts negatively charged particles (eg. humic substances, some colloids) often facilitating superior filtration of high-solids sludges.

Calcined magnesia is also appreciably safer to handle than a range of other alkalis such as caustic soda. Magnesia-based alkalis are virtually non-corrosive, only weakly exothermic and reactive and hence easy to handle, thus reducing safety concerns. These features contrast strongly with lime and other alkalis. An additional feature of calcined magnesia is the potential for the efficient (and often simultaneous) removal of a range of metals. The removal efficiency is related to the presence of a high pH immediately adjacent to the particle surface. This high pH zone can provide an ideal zone for the precipitation of metal hydroxides which may cement onto the surface of calcined magnesia substrate. Calcined magnesia has also been used in the simultaneous removal of ammonia and phosphate (principally in sewage) via the precipitation of struvite ($MgNH_4PO_4$).

Calcined magnesia also has a number of potential advantages relative to other remedial strategies when used as a component of LDH or HT formation. As outlined above calcined magnesia may act as both a source of alkalinity to facilitate the formation of LDH or HT and also as a source of Mg to achieve (when required with aluminate or other aluminium salts) an appropriate Mg:Al ratio. In addition, excess calcined magnesia added over the amount required for alkalinity requirements may be intimately mixed with the LDH or HT precipitate and act as a buffer to neutralise subsequent acidity and thus protect the LDH or HT from dissolution due to low pH.

In contrast in, for example, environmental applications where lime is used, even moderate over application may result in a residual pH of ca. 12 resulting in a range of deleterious effects including to endemic micro- and macro-biota, with possible re-neutralisation of any discharged water required, particularly in sensitive environmental areas (see, for example, Cortina et al, 2003).

The present invention, in some embodiments, provides a remediation method for treating acidic or alkaline surface and/or groundwater and/or porewater, or combination thereof, and be derived from active or former mineral processing or treatment or waters or oil, coal or gas including coal seam gas extraction or processing waters stored or leaking from tailings dams or other impoundments, storages or containers or waters derived from the weathering of tailings, water expressed from tailings, overburden or other waste rocks or waters derived from mineral processing residues stored in heaps as unconsolidated waste or otherwise distributed or contained both above and below ground level. The wastewaters may also be present as leaks or spills that require treatment or amendment via this method. Many of the waters described above may be present within or after a mineral extraction process or oil, coal or gas including coal seam gas extraction process and may be present as concentrates, interstitial waters or as slurries. Waters present as surface and/or groundwater or porewater of suitable composition derived from natural processes (e.g. acid sulphate soil weathering) may also be suitable for treatment by this method. In yet another aspect, waters or wastewaters derived from the operation and maintenance of nuclear power plants, nuclear weapons manufacture, maintenance or decommissioning, nuclear research facilities or similar facilities or operations may be treated and stored via this invention.

The goal of some embodiments of the present invention is to produce LDH or HT that uses aluminate [$Al(OH)_4^-$ or $AlO_2.2H_2O$] to regulate the Mg:Al ratios and to also regulate solution pH to be conducive to the formation of LDH or HT. Furthermore, the aluminate may also be used where required in combination with calcined magnesia or other magnesium-containing materials to further modify solution pH and/or Mg:Al ratios to be conducive to the formation of LDH or HT.

Notwithstanding the above, other Mg or Al salts or compounds may be added in addition to aluminate or calcined magnesia to regulate Mg:Al ratios in the solution and final LDH or HT precipitate. This further addition of Mg and/or Al may particularly be required where large amounts of other ions such as Ca or Fe or transition metals are present in solution.

A feature of the LDH or HT when formed in-situ within a range of natural or wastewaters is the broad spectrum removal of contaminants given that LDH or HT may simultaneously incorporate a suite of cations, anions, oxyanions and organic moieties into its structure within the hydroxyl layers or a interlayer ions or both. The contaminants may be derived from a variety or natural or industrial sources and may include but not be limited to metals, metalloids, actinides or daughter radionuclides.

In addition to the above, a range of other compounds or ions may also be added prior to, during or after precipitation of the LDH or HT to achieve the desired geochemical or mineralogical properties. Such compounds or ions may include silicate or other oxyanions, or organic moieties such as ethers, surfactants or dyes.

The aluminate may suitably be a reactive aluminate, such as obtained as a pregnant liquor or spent liquor from the Bayer process from the alumina industry, however solid forms or aluminate such as sodium aluminate or that produced by for instance the addition of NaOH to alumina from commercial sources may also be used.

A further advantage accrues by virtue that within the mining, mineral processing or general chemical or manufacturing spheres, industries are often co-located or located within reasonable proximity of each other. Utilisation of two or more waste streams from, for instance, mineral processing is a distinct possibility. This has the potential to be highly advantageous for both industries which may expend considerable costs in treatment and management and storage or disposal of their wastewater. Thus, the mixing of acid waste streams with sources of alkali and Al such as that produced from the Bayer Process is a potentially advantageous outcome, particularly where the acidic stream contains appreciable Mg. As outlined elsewhere in this document, where this is not the case or if additional neutralising capacity or alkalinity is required then calcined magnesia or magnesium hydroxide may be also added or other sources of Mg or Al as required to form an appropriate Mg:Al ratio in the solution or LDH or HT precipitate.

The method of the present invention has a number of advantages over prior art remediation methods, which typically involved a more generic precipitation method leading in some cases to the formation of potentially unstable secondary precipitates such as green rusts which have the potential to spontaneously decompose under varying redox conditions with possible re-release of previously removed contaminants.

The method of the present invention results in the formation of a more stable LDH or HT structure by virtue of the use of Al as one of the major structural cations in the HT lattice, rather than Fe as one of the major structural cations present in green rusts or other LDH.

The method of embodiments of the first and second aspect of the present invention also relies on the serendipitous advantage of aluminate or Al salt or reagent addition in that these Al compounds provide both Al and a source of neutralisation capacity or alkalinity conducive to the formation of LDH or HT.

The method of some embodiments of the present invention also relies on the serendipitous advantage of calcined magnesia or magnesium hydroxide or Mg salt or reagent addition in that these Mg compounds provide both Mg and a source of neutralisation capacity or alkalinity conducive to the formation of LDH or HT.

The method of some embodiments of the present invention also relies on the serendipitous advantage of using both aluminate or Al salt or reagent addition and calcined magnesia or magnesium hydroxide or Mg salt or reagent addition in that these Al and Mg compounds provide both Al and Mg and a source of neutralisation capacity or alkalinity conducive to the formation of LDH or HT where an appropriate Mg:Al ratio can be tailored for a particular natural or wastewater and to produce the HT of the desired Mg and Al content in the lattice structure.

The method of the first aspect of the present invention results in the in situ formation of LDH or HT materials. These materials are solids. These materials are generally stable at circumneutral to alkaline pH (usually pH>5). Thus, formation of the LDH or HT materials removes metal cations from the natural and wastewater(s). Advantageously, the LDH or HT materials also include exchangeable anions in the interlayer spaces, which anions may ion exchange with other deleterious anions in the natural or wastewater, such as arsenic containing anions and phosphorus containing anions. In addition there is also scope for further cation exchange or complexing with the LDH or HT after formation. This further remediates the natural or wastewater(s).

A range of metals as cations, anions or oxyanions (e.g. $CrO_4^{2-}$, $UO_2^{2+}$) of widely varying concentrations may also be simultaneously co-precipitated, hence forming a polymetallic HT or LDH. Hence, this ability to co-precipitate a suite of contaminants is highly relevant to natural and wastewater(s).

HT or LDH also have a number of other advantages in addition to their "broad spectrum" removal of contaminants.

LDH or HT uses as their building blocks many of the elements present in high concentrations in natural or wastewaters such as Mg and/or Al.

The kinetics of HT formation is rapid and, once formed, dewater rapidly, resulting in a high solids concentrate. This is in contrast to lime-amended precipitates which require mechanical de-watering or evaporation.

HT is stable above pH ca. 4-5 depending on composition and increase in stability with increasing pH. Thus, once formed, HT or LDH with their inventory of contaminants could potentially be disposed of to a tailings storage facility.

HT may also be further stabilised by the addition of polymeric silica as an interlayer anion. Once formed, this silicate-substituted HT is similar in geochemical composition to the chlorite group of minerals, specifically amesite ($Mg_6Al_4Si_4Al_4O_{20}(OH)_{16}$), a chlorite end member. For example, at the Ranger uranium mine, the potential exists for a substrate to be produced which is similar to that or the chlorite within the chloritic schists which host the Ranger mineralisation. If viewed in terms of its compatibility as a long-term repository, it would seem that this mineralogy could constitute an ideal solution to contaminant management.

The LDH formed may be HT with a predominantly Mg—Al chemistry but given the often complex nature and origin of liquid and solid waste and by-products and natural and wastewater(s) from which the LDH is formed it is understood that there may be significant deviations from this ideal Mg—Al composition. Thus, it is to be understood that the formation of other LDH materials and the formation of a mixture of LDH materials are encompassed by the present invention.

Although the LDH or HT material formed in situ is stable at alkaline pH, if the acidity is replenished (for example, by further acid contamination prior to or after disposal of the solid LDH or HT), there is a risk that the pH could decrease to a level where the LDH or HT material could dissolve, thereby again liberating the metal cations. To avoid this, an excess dose of calcined magnesia (excess to that required for neutralization of acidity and/or formation of a LDH or HT) could be used. Alternatively or additionally, further addition of aluminate, calcined magnesia or magnesium hydroxide (and other reagents as required) could be carried out. Indeed, the present invention envisages, in some embodiments, repeated or periodic injections of the reagents to maintain the stability of the LDH or HT structure.

In one embodiment, the further component is a component containing buffering anions. The component may, for example, include carbonate anions, such as sodium carbonate or sodium bicarbonate to assist in buffering acidity, oxymetallic anions such as permanganate to assist in buffering changes in redox potential or complexed anions or organometallic or organic anions which may otherwise react to form secondary species within or in addition to the LDH or HT. With these components, when the LDH or HT material is formed, the buffering anions are taken up by ion exchange for incorporation into the interlayer space of the LDH or HT material. If further acid contacts the LDH or HT material, the interlayer anions act as a buffer to minimise any pH changes, thereby reducing the likelihood of solution of the LDH or HT material. It will be appreciated that if the buffering capacity is exceeded, further addition of aluminate, magnesia or magnesium hydroxide or other reagent may be required. Similarly, if there is a change in the redox status, this may be partially buffered by the incorporation of redox-sensitive species within the LDH or HT structure.

In another embodiment, the further component is a component containing one or more moieties that takes place in the reaction to form the LDH or HT material, with the one or more moieties being incorporated into the LDH or HT material matrix or crystal structure. For example, the further component may contain a silicate and/or aluminate/aluminium moiety, which is taken up into the matrix or crystal structure of the LDH or HT material to thereby form a more stable LDH or HT material. Silicate provides stability as with this anion in place, the LDH or HT material begins to resemble a clay material. As discussed above, minerals with a clay-like composition such as chlorite may be produced, specifically amesite ($Mg_6Al_4Si_4Al_4O_{20}(OH)_{16}$), a chlorite end member, however, additional substitution of ions may also take place. A number of other moieties either by themselves or in combination (e.g. silicate and aluminate) may also be used to stabilise the LDH or HT material or modify the solution chemistry prior to layered double hydroxide formation to yield the desired composition. For example, the interlayer anions may be tailored to provide stability against, say, reductive dissolution if for instance the trivalent cation in the layered double hydroxide material was $Fe^{3+}$ and reduction to $Fe^{2+}$ would lead to a loss of interlayer charge.

The moiety may also include nitrate anions (as a source of N where N may be limiting in a biological process) or sulphate anions where sulphate reduction constitutes a concurrent or additional remediation step. The moiety may also include phosphate ions (as a source of P where P may be limiting in a biological process taking place in the system).

The moiety may also include anions of radioactive elements (e.g. Mazeina et al., 2003, Ulibarri et al, 2001). Thus radioactive cations may be incorporated into the primary hydroxyl layer structure of the LDH or HT material or incorporated as interlayer ions depending on the speciation and solution chemistry.

The further component (e.g. reagents such as silicate and/or aluminate) could be added prior to the aluminate or calcined magnesia or magnesium hydroxide to the natural or wastewater. Alternatively, the further component could be added with the aluminate, calcined magnesia or magnesium hydroxide, or the further component could be added after the aluminate, calcined magnesia or magnesium hydroxide to the natural or wastewater.

In some embodiments, the present invention allows the natural or wastewaters to be protected by neutralising any escaping acidic solution and removing deleterious metal or metalloid ions, oxyanions or other contaminants from the escaping acidic leaching solution. Thus, the method of such embodiments of the present invention overcomes many of the environmental concerns surrounding in situ leaching of ore bodies but is also directly applicable to the treatment of waters and wastewaters derived from the mining, extraction, metallurgical or other processing or treatment of ore from open cut, pit or underground mining operations.

Indeed, it will be appreciated that by "in situ leaching of an ore body," it is meant the large scale leaching of any ore, concentrate, tailings or slag or other metals-value containing material that is positioned on the ground or in the ground during the leaching process. The leachate may also be derived from any part of the treatment, disposal or metal/metalloid recovery or beneficiation process at a minesite or other or remote locality. The leachate may also be recovered from a tailings dam or it may be leakage from a tailings dam. In addition the leachate may also be considered to be spillages due to accidents or errors during the recovery or processing of ore-bearing solutions that, or have the potential to, enter the groundwater or have entered (infiltrated) the groundwater via surface contamination.

Previous research has noted the uptake of actinides or radionuclides into LDH or HT structures including the uptake of low concentrations of U into HT like materials in epoxy resins for use in semiconductor devices (Akira Okada et al U.S. Pat. No. 6,287,532), as corrosion products from the nuclear industry (e.g. Marks et al., 1995, Mazeina et al., 2003) or the use of HT like materials as an adsorbent once formed (Vierheilig U.S. Pat. No. 7,417,005). Thus, the use of LDH or HT/HT-like compounds is well known. However, none use aluminate and/or the combination of calcined magnesia, magnesium hydroxide or Mg and/or Al salts to tailor the composition and most use the properties of HT once formed and not as an in-situ precipitate.

The formation of LDH or HT and, in particular, by the addition of aluminate or Al hydroxides and other Mg or Al salts as required for instance to regulate the dissolved and precipitate Mg:Al ratio is particularly applicable to nuclear wastes. This is because these nuclear wastes are often complex mixtures of ions with a range of chemistry such as U, Th, Ra, Tc, Co etc as cations, anions and oxyanions and organic complexes and salts which may be readily incorporated into the HT structure. Indeed, many prior studies have noted the formation of HT as a product of in-situ corrosion within nuclear reactor fuel elements (e.g. Mazeina et al., 2003). In addition, LDH or HT are noted for their inherent ability to incorporate into their structure of exchange a wide variety of radionuclides or daughter elements present as anions, cations or anions as described above. The concept expressed here intends to exploit the observed phenomena of LDH or HT formation due to corrosion in nuclear fuel elements and the broad spectrum removal of both non-radioactive and radioactive contaminants by LDH or HT formation. This occurs via the addition of aluminate, Al hydroxyl species and Mg and Al salts as required to waters or wastewaters to form a stable broad spectrum repository. In addition, this LDH or HT formed and hosting both or either radioactive and non-radioactive contaminants may be further stabilised by the addition or other ions such as silicate, by partial or complete calcination leading to dehydration, recrystallisation or vitrification, co-amendment or encapsulation or a combination of the above reagent addition as described elsewhere in the document.

According to a further aspect, the present invention provides a process for treating water containing nuclear wastes comprising adding at least one Mg-containing compound or at least one Al-containing compound (or both) to the water to thereby form an LDH containing Mg and Al as predominant metal species in a lattice of the LDH.

The method of these embodiments of the present invention is particularly useful for the immobilisation of U or U-species from solution. Uranium has a complex solution chemistry. In general, U forms U-containing cations at low pH such as the uranyl cation and may form a range of variably charged anionic species as pH increases. If there is any escape or loss of acidic leaching solution from an in situ leaching operation of a material containing U or during processing, the U species may be taken up within the LDH or HT material in two modes—as pH increases, the uptake of $UO_2^{2+}$ in polymeric mixed hydroxide metal layers and/or as pH increases, as a range of variable charged anionic species (e.g. $UO_2(CO_3)_2^{2-}$, $UO_2(CO_3)_3^{4-}$) which occupy the expandable interlayer regions. Thus, the method of the present invention, in resulting in the in situ formation of LDH or HT materials in the event of any escape of extracted or processing water(s), can remove U-containing cations and U-containing anions. This is a significant benefit of the present invention.

In some embodiments, the LDH material that is formed may include green rust (e.g. Taylor, 2000) in addition to the HT. The formation of green rust may be especially useful in the treatment of uranium-containing waters or in the leaching of uranium-containing ore bodies. In particular, green rust tends to spontaneously decompose on exposure to oxygen (in air) leading to the formation of more Fe-hydroxide or Fe-oxyhydroxide minerals such as goethite (FeOOH). These secondary oxyhydroxides also have an ability to scavenge U and a range of other anions or cations (e.g. as the uranyl cation or other more complex anions) during formation thus retarding the movement of U if the redox environment of the natural and wastewater(s) changes from reducing to oxidizing during the short-term or over geological time. However, most of the U is scavenged where total carbonate is low (e.g. Hsi and Langmuir, 1985). Subsequent reduction of the Fe-hydroxides or Fe oxyhydroxides formed from the decomposition of green rusts may also lead to their dissolution and release of contaminants contained within or adsorbed by them. Importantly, however, HT with a predominant Mg—Al chemistry (i.e. not containing significant Fe) thus confers a substantial advantage over green rusts in terms of its redox stability.

Green rust also has the ability to reduce the uranyl cation ($UO_2^{2+}$) to uraninite ($UO_2$), which has many implications to the remediation/retardation of the movement of U in the precipitated material after neutralization (e.g. Genin et al., 2001, O'Loughlin et al., 2003, Roh et al., 2000). Green rust (as have other LDH or HT materials) also has the ability to exchange anions, some of which have the potential to be reduced to other forms.

The formations of HT from waters or wastewaters emanating from one or more regions through or near the ore body such as an abandoned in-situ leaching U mine may also be considered as a rehabilitation method, for example, to rehabilitate an old mine or old leaching site. The rehabilitation method may form part of the decommissioning/closure of a mine or other site. The dosage of material into one or more regions through or near the ore body may be based on an estimate of the residual acidity and adding at least a stoichiometric amount of alkaline material, such as solid alkaline material. The prevailing range(s) of solution chemistry may also be used to estimate the required amount and sequence of addition of aluminate, magnesia or magnesium hydroxide or mixtures thereof and/or other reagents in any desired order or proportion(s) as required.

The present invention may also be used to protect the surface and subsurface in the vicinity of pipelines or storage tanks having acidic or alkaline solutions having dissolved divalent or trivalent metal ions from leakage or spillage.

In a further aspect, the present invention provides a method to protect the surface and subsurface in the vicinity of pipelines or storage tanks having acidic or alkaline solutions having dissolved divalent or trivalent metal ions from leakage or spillage, the method including the step of injecting a slurry or suspension of aluminate, calcined magnesia or magnesium hydroxide magnesia of magnesium hydroxide or mixtures thereof and/or other reagents in any desired order or proportion(s) as required into the ground in the vicinity of the pipeline or storage tank such that a leak or spill of the acidic solution causes the leaked or spilled solution to contact the aluminate, magnesia or magnesium hydroxide and the divalent and trivalent metal cations react to form a LDH or HT material.

In yet a further aspect, the present invention provides a method to protect the surface and subsurface in the vicinity of pipelines or storage tanks having acidic or alkaline solutions having dissolved divalent or trivalent metal ions from leakage or spillage, the method including the steps of placing a solid alkaline material into one or more regions in the vicinity of the pipeline or storage tank such that that a leak or spill of the acidic or alkaline solution causes the leaked or spilled solution to contact the aluminate, magnesia or magnesium hydroxide and also placing a component containing one or more buffering anions into the one or more regions, wherein whenever the spilled or leaked acidic solution contacts the aluminate, magnesia or magnesium hydroxide in the one or more regions, LDH or HT material forms and the buffering anion is taken up as an interlayer anion in the LDH or HT material.

In a still further aspect, the present invention provides a method to protect the surface and subsurface solutions having dissolved divalent or trivalent metal ions from leakage or spillage, the method including the steps of placing aluminate, magnesia or magnesium hydroxide into one or more regions in the vicinity of the pipeline or storage tank such that that a leak or spill of the acidic or alkaline solution causes the leaked or spilled solution to contact the magnesia or magnesium hydroxide and also placing into the one or more regions a component containing a moiety that is incorporated into a LDH or HT material, wherein whenever the spilled or leaked acidic or alkaline solution contacts the aluminate, magnesia or magnesium hydroxide in the one or more regions, LDH or HT material forms, which layered double hydroxide material incorporates the moiety.

The regions in the vicinity of the pipeline or storage tank may be around the pipeline or storage tank, under the pipeline or storage tank or above an underground pipeline or storage tank.

In some embodiments of the present invention, LDH materials may form and there is a possibility that other phases which may also be useful may also be formed as the pH increases during neutralization. Ideally, however, LDH or HT are the predominant mineral phase formed. For example, Al—Si phases such as allophane and imogolites may be formed. These materials are known to have ion exchange properties at low to intermediate pH and cation exchange properties at higher pH, or zeolitic phases. In addition, oxide, hydroxide or oxyhydroxide phases containing one or more of Fe, Al, and Si may be formed. These materials may incorporate metals and/or anions into their structure and/or absorb metals and/or anions to their external or internal surfaces, depending on pH. Any or all of the above materials may augment the function of the LDH or HT materials in remediating the natural or wastewater. Indeed, in some embodiments, green rust is formed along with the HT. This material can decompose when exposed to oxidising conditions to form Fe-hydroxide and Fe-oxyhydroxide minerals which can scavenge a range of anions and cations and also reduce cations to forms that are more easily removed from the water.

In all aspects of the present invention, it is possible that repeated additions of consisting of aluminate, magnesia or magnesium hydroxide or mixtures thereof and/or other reagents in any desired order or proportion(s) as required may be made. Additions of aluminate, magnesia or magnesium hydroxide may be made at intervals or in response to increasing acidity.

In all aspects of the present invention, further additives may be added with, prior, or after the aluminate, magnesia or magnesium hydroxide. For example, other agents may include surfactants, flocculants, suspending agents or viscosity modifying agents or rheology modifying agents, or instance, to facilitate the formation of a micelle or emulsion to transport and/or modify the reactivity the aluminate, magnesia or magnesium hydroxide. Other agents such as silicate may also be added.

In all aspects of the present invention, the method may further include the step of conducting a pre-treatment to facilitate the formation of a desired or pre-determined LDH or HT material. For example, where the natural or wastewater being treated has insufficient levels of Al- and/or Mg-cations for HT formation it may be treated to increase the level of Al- and/or Mg-cations in the natural or wastewater to promote the formation of HT as the predominant LDH.

For example, an additional type of (pre-) amendment may involve the addition of Al as an acidified solution to yield a desired range of trivalent cation ratios (Al/(Al+Fe)) expressed as mole fractions ranging from that present in the natural or wastewater up to mole ratios of Al/(Al+Fe) of e.g. >0.9. On this basis, a specific type of LDH mineral may be formed such as HT which will be more resistant to changes in the redox geochemistry of the wastewater. Similarly a combination of reagents such as, for example, magnesia, magnesium hydroxide and sodium aluminate may be added simultaneously. Other pretreatments will also be apparent.

The desired pre-treatment may be determined by analyzing the natural or wastewater, determining a LDH or HT material to be formed and adjusting the cations and/or (oxy)anions present to achieve formation of the desired LDH or HT material. The material containing a species that forms the cations is preferably a solution containing the cations. The solution is suitably added into a designated structure such as a waste dump, waste stream or chemical reactor. It will be appreciated that the desired LDH or HT material will not necessarily be the only material to be formed.

Where appropriate, partial or total evaporation may be used to increase the concentrations of dissolved, colloidal or particulate constituents or additional added constituents such as Mg and/or Al, (e.g. to tailor the appropriate Al to Mg ratio) to increase the concentration by a sufficient degree to induce the formation of LDH or HT and thus confer the benefits of forming this mineralogy. This evaporation step, possibly in combination with other steps such as calcination or vitrification or co-amendment or encapsulation may render a concentrated or solid residue suitable for disposal in repositories or pits as in the case of nuclear power, weapon by-products or wastes or other by-products or wastes such as those derived from industrial or metallurgical processes.

The LDH or HT may also be used as a repository of elements or components of solid wastes including contaminants and radionuclides that have been dissolved (e.g. by acid or alkali) and precipitated or recrystallised using the method/chemistry described here. Other structural elements, ions or compounds (e.g. Zr, ZrO. Cr, La, rare earth elements-REE, metals Zn) and/or interlayer ions may be incorporated both inorganic (e.g. Si, $MnO_4$, $HCO_3$, $CO_3$, $PO_4$ etc), and organic (e.g. organic ligands, clathrates, crown ethers, surfactants) to assist in both substitution and incorporation of ions from solution and/or increased physical or chemical stability. This increased stability of LDH or HT or chlorite-like minerals or other LDH or HT derivatives may also be achieved possibly in combination with chemical methods described above by calcination or vitrification leading to part or complete dehydration and partial/total recrystallisation. Co-amendment or encapsulation in addition to calcination, vitrification or recrystallisation or combinations thereof may also be used as options to further increase LDH or HT physical or chemical stability for example in the long-term disposal and storage of mining, industrial or nuclear waste(s).

Subsequent formation of chlorite- or phyllosilicate-like minerals from pure Mg—Al or predominantly Mg—Al HT which may be similar to or iso-chemical in composition or may possess a similar chemistry with substitution of some ions as determined by the nature of Mg and/or Al added or the nature and chemical composition of the natural or wastewater which may influence the final geochemical composition and mineralogy.

EXAMPLES

Example 1

Liquid or solid waste or by-products or natural or wastewater(s) or combinations thereof may be dosed with aluminate, calcined magnesia and other Al or Mg compounds according to factors such their acidic-neutralisation requirements or to achieve the desired Mg:Al ratio in the solution or final precipitate. In addition, given the buffering effect on the reactivity of magnesium hydroxide at alkaline pH, additional neutralisation capacity could remain in situ in the event of additional acidity being generated either locally (eg. from industrial processes) or being transported from elsewhere. The expected secondary mineralogy to be formed in the precipitate, namely, LDH minerals or HT, or mixtures thereof, are expected to be highly stable. In addition, layered double hydroxide minerals such as HT also have the capacity to complex potentially problematic ions including radionuclides via internal ion-exchange, adsorption or incorporation into the LDH or HT structure during formation. The LDH or HT minerals may also be further stabilised by Si- and/or Al-exchange to form a precursor to an aluminosilicate clay mineral. The layered double hydroxide may also be made more stable to further acidity or changes in redox potential by the addition of other anions such as carbonate and permanganate respectively. The rapid reaction of aluminate, magnesia or magnesium hydroxide is preferred to enhance the rate of formation of LDH or HT, or mixtures thereof, relative to other secondary minerals which might normally predominate during a relatively slow natural attenuation process or where Mg or Al concentrations in the original natural or wastewater are not conducive to LDH or HT formation.

Example 2

A simulated wastewater prepared in the laboratory containing 6000 ppm $Mg^{2+}$, 50 ppm $Fe^{3+}$, 800 ppm $Al^{3+}$ and 37000 ppm $SO_4^{2-}$ of pH 2.5 closely resembling that produced in the Ranger Uranium mine, Australia (see IAEA, 2004 p 11, Table 1 for detailed chemistry) was treated by contacting with quantities of sodium aluminate, in this case as process water derived from an aluminium refinery using the Bayer Process. After aluminate addition there was an increase in solution pH to 7. Further alkali (as NaOH) was added to give a final pH of 10. Both $Fe^{3+}$ and $Al^{3+}$ were quantitatively removed, as were a range of transition metal ions including U, As, Cu, Pb and Se. Initial tests have also shown that a range of anions was also reduced in concentration in the water with the sulphate anion as the major interlayer anion. Mg and Al were the predominant metal species in the LDH lattice with the presence in the precipitate formed of HT in particular confirmed by X-ray Diffraction analysis. Other Mg-rich wastewaters are also common in uranium milling or processing such as those produced in Hungary and Portugal (IAEA, 2004) and hence also have the potential to be treated by the process described herein.

Example 3

In-situ leach (ISL) mining operations have been used extensively worldwide, principally for the recovery of uranium (Mudd, 2001a). This is because U may be soluble under both acid and alkaline conditions. While the majority of in-situ leach (ISL) mining operations have used acid, such as sulphuric acid, as part of a leaching agent, some ISL mines have also utilised alkali in the form of carbonate-bicarbonate leaching agent due to the solubility of uranium at high pH in carbonate complexes (e.g. former Soviet Union, Mudd, 2001).

Where acid ISL extraction is used there is a strong likelihood that Al from clays and other minerals will also be at least partially solubilised under these acidic conditions with possible colloidal or particulate phases also present. The dissolved Al will generally be in the form of $Al^{3+}$ or complexes. Thus fluids generated from acid ISL mining may potentially be remediated in the subsurface by the addition of Mg in the form of calcined magnesia (MgO) or Mg salts to form LDH or HT. This remediation may be in-situ within the aquifer or may also be applied to acid waters or acid process waters generated from the ISL operation that require remediation. Al-balance may be achieved by adding Al-containing compounds, if necessary.

Where alkaline ISL extraction is used there is a strong likelihood that Al from clays and other minerals will also be at least partially solubilised under these alkaline conditions with possible colloidal or particulate phases also present. The dissolved Al will generally be in the form of aluminate or alkaline complexes. In an analogous way to the generation of fluids containing uranium from acid leach ISL operations, the formation of LDH or HT from alkaline ISL operations may then be facilitated by the addition of Mg in the form of calcined magnesia (MgO) or Mg salts. This remediation may be in-situ within the aquifer or may also be applied to alkali waters or alkali process waters generated from the ISL operation that require remediation. Again, Al-balance may be achieved by adding Al-containing compounds, if necessary.

Example 4

This example shows the formation of hydrotalcites in Ranger Mine process water, Formation of hydrotalcites is favoured by high concentrations of both $Mg^{2+}$ and $Al^{3+}$ which dominate the aqueous cation geochemistry by virtue of the sulfuric acid co-dissolution of chloritic schists during ore extraction. Similarly, the anion chemistry is dominated by $SO_4^{2-}$. The generation of Ranger process water via the partial neutralisation of tailings slurry from ca. pH 2 to ca. pH 4 by the addition of lime as part of the current tailings treatment process ensures that considerable $Ca^{2+}$ is also present. Also of note are the substantial $Mn^{2+}$, $Mn^{4+}$ and $N-NH_3$ concentrations, a reflection of the metallurgical processes used to extract the ore. A typical chemistry of Ranger process water is given in Table 1. Table 1 also shows water analysis after various treatments.

Example 5

Recovery of coal seam gas operations may produce many megalitres of water associated with the recovery of the contained gas. Many of these waters are naturally-occurring brines and may contain a variety or organic and inorganic contaminants derived from the aquifer or contributed to by the extraction process. Some brines may also be acidic due to the oxidation of contained sulphides. In particular, the brines may also contain considerable Mg which is an essential building-block for the formation of LDH or HT. Thus, a potential exists for the efficient removal of both organic and inorganic contaminants via the addition of an alkaline Al source such as aluminate to induce the formation of LDH or HT with the concomitant removal of a suite of contaminants.

TABLE 1

Composition of major and selected trace elements in Ranger process water prior to and following treatment with $NaAl(OH)_4 + NaOH$, or $NaAl(OH)_4 + Ca(OH)_2$.

| Sample/ Analyte | Ranger process water mg/L | $NaAl(OH)_4 +$ NaOH mg/L | $NaAl(OH)_4 +$ $Ca(OH)_2$ mg/L |
|---|---|---|---|
| Na | 61 | 10877 | 2831 |
| K | 129 | 79 | 107 |
| Ca | 543 | 153 | 461 |
| Mg | 6371 | 2 | 118 |
| Cl | 30 | 13 | 35 |
| S—$SO_4$ | 37560 | 21920 | 7922 |
| Fe | 49 | 0.1 | 0.1 |
| Al | 812 | 0 | 0 |
| Mn | 2907 | 0 | 0 |
| N—$NH_3$ | 955 | 470 | 635 |
| Tot Alk | 0 | 3793 | 2481 |
| U | 52.6 | 0.2 | 0.005 |
| As | 0.121 | 0.007 | 0.005 |
| Cu | 21.9 | 0.1 | 1.6 |
| Pb | 2.59 | 0.01 | 0.01 |
| Se | 0.27 | 0.03 | 0.02 |
| Si | 74.9 | 0.3 | 0.6 |

The typical $Mg^{2+}:Al^{3+}$ molar ratio in Ranger process water is ~8.7:1, however, this ratio may vary significantly and may be substantially lower (~3-4) in the tailings slurry prior to lime addition.

It was postulated that the formation of hydrotalcite with a suitable stoichiometry, i.e. a $Mg^{2+}:Al^{3+}$ molar ratio of ca. 2:1 to 3:1, from the Mg-rich Ranger process water could be facilitated via aluminate addition from one or more commercially-derived Bayer Process liquors or wastewaters. The addition of Bayer Process liquor or wastewaters serves three simultaneous purposes:

reduction of the $Mg^{2+}:Al^{3+}$ molar ratio to the desired range without significant Fe addition;

raising of the pH (>5) sufficiently to form hydrotalcites; and, the provision of abundant carbonate/bicarbonate as a potential interlayer ion.

Thus, in-situ formation of hydrotalcites could constitute a viable option for the simultaneous removal and stabilisation of the broad spectrum of contaminants in the Ranger process water. Importantly, hydrotalcites, and in particular those that contain carbonate/bicarbonate as the predominant anion, have also been demonstrated to have a considerable capacity to neutralise a range of mineral acids via consumption of both the hydroxyl and carbonate anions contained within their structure (e.g., Kameda et al., 2003). This neutralisation capacity may confer a particularly important characteristic as a mineral buffer intimately associated with the precipitate, which may also include tailings with a potential for long-term release of acidity.

There are many potential advantages of the use of Bayer Process liquor or wastewaters which are highly alkaline and contain Na-aluminate $(NaAl(OH)_4)$ for hydrotalcite formation, in the context of treatment of Ranger process water or other types of acid mine waters elsewhere, in particular those that contain abundant Mg and/or Al. In addition to the "broad spectrum" removal of contaminants as elucidated above, specific advantages of hydrotalcites include:

The kinetics of hydrotalcite formation are rapid (liquid-liquid mixing) and, once formed, hydrotalcites dewater rapidly, resulting in a high-solids concentrate. In contrast, lime-amended (liquid-solid mixing) precipitates frequently require more thorough mixing and mechanical de-watering or evaporation.

During formation, in-situ hydrotalcite precipitation may promote entrainment or aggregation of colloidal or particulate material, thus increasing effluent clarity and solids removal.

Hydrotalcites are stable at pH>ca. 5, depending on composition, and increase in stability with pH.

Final pH can be tailored to incorporate particular anions, as carbonate is the most favoured interlayer anion up to pH ~11.5, while at pH ~8.5 a change in the carbonate-bicarbonate equilibrium takes place that allows for the potential incorporation of other anions.

Hydrotalcites may also be further stabilised by the addition of interlayer silica which may polymerize after addition. This silicate-substituted hydrotalcite is similar in composition to the chlorite group of minerals, specifically amesite ($Mg_6Al_4Si_4Al_4O_{20}(OH)_{16}$), a chlorite mineral endmember. Thus, the potential exists for a substrate to be produced which is similar to that of the chlorite within the chloritic schists which host the Ranger mineralisation. If viewed in terms of its compatibility as a long-term repository, it would seem that this mineralogy may constitute an ideal solution to contaminant management.

Hydrotalcite precipitation from Ranger process water has the potential to quantitatively remove Mg, Mn and Fe, added Al from aluminate in addition to a substantial proportion of $SO_4$ while only increasing Na via aluminate addition. This may make treated process water more amenable to reverse osmosis polishing.

Those skilled in the art will appreciate that the present invention may be subject to variations and modifications other than those specifically described. It is to be understood that the present invention encompasses all such variations and modifications that fall within its spirit and scope.

References

Albiston, L., Franklin, K. R., Lee, E. and Smeulders, J. B. A. F., (1996). Rheology and microstructure of aqueous layered double hydroxide dispersions. *J. Mater. Chem.*, 6, 871-877.

Amin, S, and Jayson, G. G., (1996). Humic substance uptake by HT and PILCS. *Wat. Res.*, 30, 299-306.

AN ZECC/NHMRC (1992). Australian and New Zealand Guidelines for the Assessment and Management of Contaminated Sites. Australian and New Zealand Environment and Conservation Council and National Health and Medical Research Council.

Boclair, J. W and Braterman, P. S., (1999). Layered double hydroxide stability. 1. Relative stabilities of layered double hydroxides and their simple counterparts. *Chem. Mater.* 11, 298-302.

Bourrie, G., Trolard, F., Refait, P. and Feder, F., (2002). A solid solution model for $Fe^{II}$—$Fe^{III}$—Mg green rust (fougerite): structural and geochemical constraints. 17$^{th}$ WCSS, 14-17 August, 2002, Thailand, Paper no. 1653, 19 pp.

Cavani, F., Trifiro, F. and Vaccari, A., (1991). HT-type anionic clays: preparation, properties and applications. *Catalysis Today*, 11, 173-301.

Cortina, J., Lagreca, I., De Pablo, J., (2003). Passive in situ remediation of metal-polluted water with caustic magnesia—evidence from column experiments. *Environ. Sci. Technol.* 2003, 37, 1971-1977.

Depege, C., El Metoui, F.-Z., Forano, C., de Roy, A., Dupuis, J. and Besse, J-P., (1996). Polymerization of silicates in layered double hydroxides. *Chem. Mater.*, 8, 952-960.

Douglas, G. B. (2008) Remediation of Groundwater—PCT/AU2007/000452

Feitknecht, W von, (1942). Uber die Bildung von Doppelhydroxen zwischewn zwei- und dreiwertigen Metallen. *Helv. Chim. Acta.*, 25, 555-569.

Ford, R. G., Scheinost, A. C, Schekel, K. G. and Sparks, D. L., (1999) The link between clay mineral weathering and the stabilization of Ni surface precipitates. *Environ. Sci. Technol.*, 33, 3140-3144.

Frondel, C., (1941). Constitution and polymorphism of the pyroauritic and sjogrenite groups. *Amer. Mineral.*, 26, 295-306.

Genin, J.-M. R., Refait, P., Bourrie, G., Abdelmoula, M. and Trolard, F., (2001). Structure and stability of the Fe(II)-Fe(III) green rust "fougerite" mineral and its potential for reducing pollutants in soil solutions. *Appl. Geochem.*, 16, 559-570.

Hsi, C. K. D. and Langmuir, D. (1985). Adsorption of uranyl onto ferric oxyhydroxides: Application of surface complexation site binding model. *Geochim. et Cosmochim. Acta*, 49, 2423-2432.

IAEA (2004). Treatment of liquid effluent from uranium mines and mills. Report of a co-ordinated research project 1996-2000. *International Atomic Energy Agency (IAEA)* TECDOC-1419. 246 pp.

Kameda, T., Yabuuchi, F., Yoshioka, T., Uchida, M. and Okuwaki, A., (2003). New method of treating dilute mineral acids using magnesium-aluminum oxide. *Wat. Res.*, 37, 1545-1550.

Marx, G., Altenhein-Haese, C., Bischoff, H, Engelhardt, J. and Feldmaier, F., (1995). Investigations into speciation; sorption and corrosion of actinides in systems of high ionic strength. *J Radioanalytical and Nuclear Chemistry*, 195, 95-105.

Mazeina, L., Curtius, H, Fachinger, J. and Odoj, R (2003). Characterisation of secondary products of uranium-aluminium material test reactor fuel element corrosion in repository-relevant brine. *J. Nuclear Materials*, 323, 1-7.

Misra, C. and Perrotta, A. J., (1992). Composition and properties of synthetic HT. *Clay and Clay Min.*, 40, 145-150.

Miyata, S., (1980). Physico-chemical properties of synthetic HT in relation to composition. *Clay and Clay Min.*, 28, 50-56.

Miyata, S., (1983). Anion-exchange properties of HT-like compounds. *Clay and Clay Min.*, 31, 305-311.

Mudd, G. M., (2001a). Critical review of acid in situ leach mining: 1. USA and Australia. Environmental Geology, 41, 390-403.

Mudd, G. M., (2001b). Critical review of acid in situ leach mining: 2. Soviet Bloc and Asia. Environmental Geology, 41, 404-416.

O'Loughlin, E. J., Kelly, S. D., Cook, R. E., Csencsits, R. and Kemner, K. M., (2003). Reduction of uranium (VI) by mixed Fe(II)/Fe(III) hydroxide (Green rust): Formation of $UO_2$ nanoparticles. *Environ. Sci. Technol.*, 37, 721-727.

Oobuku, A., Ooi, K. and Hayashi, H., (1993). Preparation and phosphate ion-exchange properties of a HT-like compound. *Langmuir*, 9, 1418-1422.

Parkhurst, D. L., (1995). Users guide to PHREEQC—A computer program for speciation, reaction-path, advective transport, and inverse geochemical calculations. Wat. Res. Investigation Rpt. 95-4277, USGS Reardon, E. J. and Della Valle, S., (1997), Anion sequestering by the formation of anionic clays: lime treatment of fly ash slurries. *Environ. Sci. Technol.*, 31, 1218-1223.

Roh, Y., Lee, S. Y., Elles, M. P. Foss, J. E., (2000). Incorporation of radioactive contaminants into pyroaurite-like phases by electrochemical synthesis. *Clay and Clay Miner.*, 48, 266-271.

Sato, T., Wakabayashi, T. and Shimada, M., (1986). Adsorption of various anions by magnesium aluminium oxide. *Ind. Eng. Chem. Prod. Res.*, 25, 89-92.

Seida, Y. and Nakano, Y., (2000). Removal of humic substances by layered double hydroxide containing iron. *Wat. Res.*, 34, 1487-1494.

Seida, Y. and Nakano, Y., (2002). Removal of phosphate by layered double hydroxides containing iron. *Wat. Res.*, 36, 1306-1312.

Shin, H-S., Kim, M-J., Nam, S-Y. and Moon, H-C., (1996). Phosphorus removal by HT compounds (HTLcs). *Wat. Sci. Tech.*, 34, 161-168.

Taylor, R. M. (1984). The rapid formation of crystalline double hydroxy salts and other compounds by controlled hydrolysis. *Clay Min.*, 19, 591-603.

Taylor, R. M. (2000). Method of treating acidic waste water. U.S. Pat. No. 6,139,753.

Taylor, R. M. and McKenzie, R. M., (1980). The influence of aluminium and iron oxides VI. The formation of Fe(II)-Al (III) hydroxy-chlorides, -sulphates, and -carbonates as new members of the pyroaurite group and their significance in soils. *Clay and Clay Min.* 28, 179-187.

Thornber, M. R. and Hughes, C. A., (1987). The mineralogical and chemical properties of red mud waste from the Western Australian alumina industry. In Wagh, A. S, and Desai, P (Ed.), *Proc. Int. Conf. Bauxite Tailings*, Kingston, Jamaica. 1-19.

Ulibarri, M. A., Pavlovic, I., Barriga, C., Hermosin, M. C., Cornejo, J. (2001). Adsorption of anionic species on hydrotalcite-like compounds: effect of interlayer anion and crystallinity. *Appl Clay Sci.*, 18, 17-27.

Vierheilig, A. A., (2006) Process for making, and use of, anionic clays U.S. Pat. No. 7,417,005

Vucelic, M., Jones, W. and Moggridge, G. D., (1997). Cation ordering in synthetic layered double hydroxides. *Clays and Clay Min.*, 45, 803-813.

The invention claimed is:

1. A process of treating a natural water or wastewater including brines or a process water containing dissolved Mg or dissolved Al and one or more contaminant species comprising one or more cationic contaminants and one or more anionic contaminants, the process comprising:
the steps of adding at least one Mg-containing compound or at least one Al-containing compound or both to the natural water or wastewater containing the dissolved Mg or dissolved Al and the one or more contaminant species under conditions to form in-situ a layered double hydroxide (LDH), the LDH containing Mg and Al as predominant metal species in a lattice of the LDH
whereby the one or more of the cationic contaminants or one or more of the anionic contaminants are incorporated into the lattice of the LDH and an interlayer of the LDH respectively during in situ formation of the LDH to thereby reduce or remove the one or more contaminant species from the natural water or wastewater.

2. A process as claimed in claim 1 wherein one or more cationic contaminants become incorporated into the LDH lattice and one or more anionic contaminants become incorporated into the interlayer.

3. A process as claimed in claim 1 comprising the steps of adding at least one Al-containing compound to the natural water or wastewater to form an LDH containing Mg and Al as predominant metal species in a lattice of the LDH or adding at least one Mg-containing compound to the natural water or wastewater to form an LDH containing Mg and Al as predominant metal species in a lattice of the LDH.

4. A process as claimed in claim 1 wherein additional Al or Mg is added in order to adjust the ratio of Al to Mg in the natural water or wastewater to a desired level to obtain LDH or HT containing Mg and Al as predominant metal species in a lattice of the LDH.

5. A process as claimed in claim 1 further comprising selective, partial or total removal of LDH and/or other mineral (co-) precipitates for the purposes of recovery and extraction, refinement or reprocessing of one or more metal, metalloid or other element values for environmental or commercial purposes, or further comprising partial or total removal of water or other solvents or miscible or immiscible solutes to increase concentrations of one or more of dissolved, colloidal or particulate constituents or additional added constituents to increase the concentration to facilitate or induce the formation of LDH.

6. A process as claimed in claim 1 wherein calcined magnesia is added and the calcined magnesia contains lime and results in formation of gypsum.

7. A process as claimed in claim 1 wherein other of metals cations, anions or oxyanions including radionuclides and radioactive or stable daughter elements or species are also simultaneously co-precipitated to form a polymetallic LDH.

8. A process as claimed in claim 1 wherein a component containing buffering anions is also added, the component includes carbonate anions to assist in buffering acidity, or oxymetallic anions to assist in buffering changes in redox potential, or complexed anions or organometallic or organic anions which react to form secondary species within or in addition to the LDH.

9. A process as claimed in claim 1 wherein a component containing one or more moieties that takes place in the reaction to form the LDH, with the one or more moieties being incorporated into a LDH matrix or crystal structure, is added.

10. A process as claimed in claim 9 wherein the component contains a silicate and/or aluminate/aluminium moiety or combination thereof, which is taken up into the LDH matrix or crystal structure to form a more stable LDH material.

11. A process in accordance with claim 5 further comprising partial or total removal of water or other solvents or miscible or immiscible solutes to increase concentrations of one or more of dissolved, colloidal or particulate constituents or additional added constituents to increase the concentration to facilitate or induce the formation of the LDH, wherein the one or more of dissolved, colloidal or particulate constituents or additional added constituents comprises Mg and/or Al.

12. A process in accordance with claim 7 wherein radionuclides, radioactive or stable daughter elements or species are also simultaneously co-precipitated, wherein the radionuclides and the radioactive or the stable daughter elements or species comprises $IO_3^-$ or $TcO_4^{2-}$ or $CrO_4^{2-}$ or $UO_2^{2+}$.

13. A process in accordance with claim 8 wherein the component containing buffering anions includes carbonate anions to assist in buffering acidity, and wherein the carbonate comprises sodium carbonate and/or sodium bicarbonate and wherein the oxymetallic ions comprises permanganate ion.

14. A process of treating a solid material containing Mg or Al in a reactive, labile or soluble form and one or more other contaminant species comprising one or more cationic contaminants and one or more anionic contaminants, the process comprising the steps of:
adding at least one Mg-containing compound or at least one Al-containing compound to the solid material containing Mg or Al and the one or more other contaminant species under conditions to form in situ a LDH containing Mg and Al as the predominant metal species in a lattice of the LDH following dissolution of the at least one Mg- and/or the at least one Al-containing compound;

whereby one or more of the cationic contaminants and one or more of the anionic contaminants are incorporated into the lattice of the LDH and an interlayer of the LDH respectively during in situ formation of the LDH.

15. A process as claimed in claim 14 wherein the LDH forms a discrete phase, or forms a surface precipitate on the solid material that partially or completely encapsulates the solid material or modifies the micro- and macro-scale porosity, permeability or reactivity of the solid material.

16. A process as claimed in claim 14 comprising the steps of adding at least one Al-containing compound to the solid material to forn in situ a LDH containing Mg and Al as predominant metal species in lattices of the LDH following dissolution of the least one Al-containing compound, or adding at least one Mg-containing compound to the solid material to form in situ a LDH containing Mg and Al as predominant metal species in lattice of the LDH following dissolution of the at least one Mg-containing compound.

17. A process as claimed in claim 14 wherein additional Al or Mg is added in order to adjust the ratio of Al to Mg to a desired level to obtain LDH containing Mg and Al as predominant metal species in a lattice.

18. A process as claimed in claim 14 further comprising selective, partial or total removal of LDH and/or other mineral (co-) precipitates for the purposes of recovery and extraction, refinement or reprocessing of one or more metal, metalloid or other element values for environmental or commercial purposes, or further comprising partial or total removal of water or other solvents or miscible or immiscible solutes to increase concentrations of one or more of dissolved, colloidal or particulate constituents or additional added constituents to increase the concentration to facilitate or induce the formation of LDH.

19. A process as claimed in claim 14 wherein calcined magnesia is added and the calcined magnesia contains lime and results in formation of gypsum.

20. A process as claimed in claim 14 wherein other of metals cations, anions or oxyanions including radionuclides and radioactive or stable daughter elements or species are also simultaneously co-precipitated to form a polymetallic LDH.

21. A process as claimed in claim 14 wherein a component containing buffering anions is also added, wherein the component includes carbonate anions to assist in buffering acidity, or oxymetallic anions, to assist in buffering changes in redox potential, or complexed anions or organometallic or organic anions which react to form secondary species within or in addition to the LDH or HT.

22. A process as claimed in claim 14 wherein a component containing one or more moieties that takes place in the reaction to form the LDH, with the one or more moieties being incorporated into a LDH matrix or crystal structure, is added.

23. A process in accordance with claim 15 wherein the discrete phase is formed and is a porewater filling.

24. A process in accordance with claim 18 further comprising partial or total removal of water or other solvents or miscible or immiscible solutes to increase concentrations of one or more of dissolved, colloidal or particulate constituents or additional added constituents to increase the concentration to facilitate or induce the formation of the LDH, wherein the one or more of dissolved, colloidal or particulate constituents or additional added constituents comprises Mg and/or Al.

25. A process in accordance with claim 20 wherein radionuclides, radioactive or stable daughter elements or species are also simultaneously co-precipitated, wherein the radionuclides and the radioactive or the stable daughter elements or species comprises $IO_3^-$ or $TcO_4^{2-}$ or $CrO_4^{2-}$ or $UO_2^{2+}$.

26. A process in accordance with claim 21 wherein the component containing buffering anions includes carbonate anions to assist in buffering acidity, and wherein the carbonate comprises sodium carbonate or sodium bicarbonate and wherein the oxymetallic ions comprises permanganate ion.

27. A process for treating water containing dissolved Mg or dissolved Al and nuclear wastes or radioactive species including parent or daughter radionuclides as radioactive cations and radioactive anions or rare earth elements, or combinations thereof, the process comprising:

adding at least one Mg-containing compound or at least one Al-containing compound or both to the water containing the dissolved Mg or Al and the nuclear wastes or radioactive species under conditions to form in-situ an LDH containing Mg and Al as predominant metal species in a lattice of the LDH whereby one or more radioactive cations and one or more radioactive anions are incorporated into the lattice of the LDH and an interlayer of the LDH respectively during in situ formation of the LDH.

28. A process as claimed in claim 27 comprising analyzing the water, determining a LDH material to be formed and adjusting the cations and/or (oxy)anions present to achieve formation of the determined LDH material.

* * * * *

UNITED STATES PATENT AND TRADEMARK OFFICE
CERTIFICATE OF CORRECTION

| | |
|---|---|
| PATENT NO. | : 9,133,038 B2 |
| APPLICATION NO. | : 13/319983 |
| DATED | : September 15, 2015 |
| INVENTOR(S) | : Grant Brian Douglas |

It is certified that error appears in the above-identified patent and that said Letters Patent is hereby corrected as shown below:

<u>On the Title Page</u>

Left column, item (30), under Foreign Application Priority Data, after Mar. 20, 2009 (AU) replace "200901213" with --2009901213--.

<u>In the Claims</u>

In column 25, claim 16, line 18, after "material to" replace "forn" with --form--.

In column 25, claim 16, line 19, after "metal species in" replace "lattices" with --lattice--.

In column 26, claim 21, line 4, after "addition to the" replace "LDH or HT." with --LDH.--.

Signed and Sealed this
Twenty-second Day of March, 2016

Michelle K. Lee
*Director of the United States Patent and Trademark Office*